United States Patent
Nguyen et al.

(10) Patent No.: US 9,633,123 B2
(45) Date of Patent: Apr. 25, 2017

(54) DATA FEDERATION QUERY SUGGESTION

(71) Applicant: Red Hat, Inc., Raleigh, NC (US)

(72) Inventors: Filip Nguyen, Czech Republic (CZ); Filip Elias, Czech Republic (CZ)

(73) Assignee: RED HAT, INC., Raleigh, NC (US)

( * ) Notice: Subject to any disclaimer, the term of this patent is extended or adjusted under 35 U.S.C. 154(b) by 228 days.

(21) Appl. No.: 14/053,343

(22) Filed: Oct. 14, 2013

(65) Prior Publication Data

US 2015/0106353 A1    Apr. 16, 2015

(51) Int. Cl.
*G06F 17/30* (2006.01)

(52) U.S. Cl.
CPC .............. *G06F 17/30873* (2013.01)

(58) Field of Classification Search
None
See application file for complete search history.

(56) References Cited

U.S. PATENT DOCUMENTS

| | | | |
|---|---|---|---|
| 6,233,586 B1* | 5/2001 | Chang et al. | |
| 8,190,601 B2* | 5/2012 | Ahari | G06F 17/30702 707/722 |
| 8,214,325 B2 | 7/2012 | Navas | |
| 8,572,074 B2* | 10/2013 | Ahari | G06F 17/30702 707/722 |
| 8,577,913 B1* | 11/2013 | Hansson | G06F 17/30 707/767 |
| 8,819,000 B1* | 8/2014 | Acharya | G06F 17/30 707/723 |
| 8,930,338 B2* | 1/2015 | Velipasaoglu | G06F 17/30 707/706 |
| 2003/0187848 A1 | 10/2003 | Ghukasyan et al. | |
| 2005/0060289 A1 | 3/2005 | Keenan et al. | |
| 2007/0226186 A1* | 9/2007 | Ewen et al. | 707/3 |
| 2010/0299343 A1* | 11/2010 | Ahari | G06F 17/30702 707/759 |
| 2011/0191321 A1* | 8/2011 | Gade | G06F 12/08 707/709 |
| 2011/0191364 A1 | 8/2011 | LeBeau et al. | |
| 2011/0218960 A1* | 9/2011 | Hatami-Hanza | G06F 17/30 707/603 |
| 2012/0209835 A1* | 8/2012 | Ahari | G06F 17/30702 707/723 |

(Continued)

OTHER PUBLICATIONS

Schaefer et al., "Active Support for Query Formulation in Virtual Digital Libraries: A Case Study with DAFFODIL", Research and Advanced Technology for Digital Libraries, Lecture Notes in Computer Science, vol. 3652, pp. 414-425, 2005, Springer Berlin Heidelberg.*

(Continued)

*Primary Examiner* — Farhan Syed
(74) *Attorney, Agent, or Firm* — Haynes and Boone, LLP

(57) ABSTRACT

Systems and methods are provided for data federation query suggestion. An example system includes a query constraint database including at least one query constraint and a query constraint resolving module that receives from a user a query to search a federated database using a federated database search engine and determines if the query satisfies at least one query constraints. The system further includes a query suggestion module that determines a query suggestion if the query does not satisfy at least one query constraints.

17 Claims, 5 Drawing Sheets

(56) References Cited

U.S. PATENT DOCUMENTS

| | | | |
|---|---|---|---|
| 2012/0233295 A1 | 9/2012 | Bauer et al. | |
| 2012/0296927 A1* | 11/2012 | Velipasaoglu | .... G06F 17/30867 707/768 |
| 2013/0132359 A1 | 5/2013 | Lee et al. | |
| 2014/0025664 A1* | 1/2014 | Ahari | ........ G06F 17/30702 707/722 |
| 2014/0304122 A1* | 10/2014 | Rhoads | ........... G06Q 30/0643 705/27.2 |

OTHER PUBLICATIONS

Sheth et al., "Federated Database Systems for Managing Distributed, Heterogeneous, and Autonomous Databases", ACM Computing Surveys, vol. 22, No. 3, 1990, ACM.*

Lim et al., "Source-aware Multidatabase Query Processing", Apr. 1999, ResearchGate.*

Carey et al., "Towards Heterogeneous Multimedia Information Systems: The Garlic Approach ", Proceedings, RIDE-DOM '95, pp. 124-131, IEEE, 1995.*

Arens et al., "Query Reformulation for Dynamic Information Integration", JIIS 6, pp. 99-130, Kluwer Academic Publishers, 1996.*

Conrad et al., "Considering Integrity Constraints During Federated Database Design", Advances in Databases, vol. 1405 of the series Lecture Notes in Computer Science, pp. 119-133, Springer Berlin Heidelberg, 1998.*

Collet et al., "Resource integration using a large knowledge base in Carnot", Computer, vol. 24 , Issue 12, pp. 55-62, IEEE, 1991.*

Lynden et al., "ADERIS: An Adaptive query processor for Joining Federated SPARQL Endpoints", OTM 2011, Part II, LNCS 7045, pp. 808-817, 2011, Springer-Verlag Berlin Heidelberg 2011.* http://help.sap.com/businessobject/product_guides/boexir4/en/xi4_dfat_guide_en.pdf, Data Federation Administration Tool Guide, Mar. 19, 2012.

http://www.ibm.com/developerworks/webservices/library/ws-soa-infoserv1/, Dr. Guenter Sauter; Bill Mathews; Mei Selvage; Dr. Eoin Lane, Information Service Patterns, Part 1: Data Federation Pattern, IBM Corporation, Jul. 28, 2006.

http://www.ncbi.nlm.nih.gov/pmc/articles/PMC3175789/, Junjun Zhang, Syed Haider, Joachim Baran, Anthony Cros, Jonathan M. Guberman, Jack Hsu, Yong Liang, Long Yao, and Arek Kasprzyk, Ontario Institute for Cancer Research, Toronto, Informatics and Biocomputing, Ontario M5G 0A3, Canada; University of Cambridge, Sep. 19, 2011.

https://access.redhat.com/site/documentation/en-US/jBoss_Enterprise_SOA_Platform/5/pdf/5.3.1_Release_Notes/JBoss_Enterprise_SOA_Platform-5-5.3.1_Release_Notes-en-US.pdf, JBoss Enterprise SOA Platform 5.3.1 5.3.1 Release Notes, Oct. 31, 2013.

* cited by examiner

DATA FEDERATION QUERY SUGGESTION

FIELD OF DISCLOSURE

The present disclosure generally relates to a computing system, and more particularly to data federation query searches.

BACKGROUND

In computing, databases may contain a collection or data, where data is organized along data structures so that the data may be accessed and used. Databases may be searched using a database management system application that allows a user to query and locate data for use. When multiple disparate database sources are required to be searched, data federation software is required to map the separate database systems. Using a federated database system, the disparate databases may be connected through a network into a federated database; however, no data integration occurs.

As a result, when a user queries a federated database, the query must be broken down to be compatible and allow searching of each constituent database. For example, each database in a federated database may support separate query language or differ in data structure and/or accessibility. In various other federated database management systems, an administrator establishing the federated database system may establish views, or stored result sets to a defined query. The views may incorporate data from a plurality of data sources, where the view can be searched by a data user to return a narrower result set of data in the view. However, views often incorporate large amounts of data from the disparate databases. Thus, queries in a single database that may produce small results may produce large results using multiple databases or established views. Additionally, broad queries may return sensitive material in a federated database system. Wide data visibility remains a large business roadblock to implementing data federation for many companies.

BRIEF SUMMARY

This disclosure relates to federated database systems and federated database query modules. Methods, systems, and techniques for querying a federated database and providing query suggestions of noncompliant queries are provided.

According to an embodiment, a system for data federation query suggestions includes a query constraint database including at least one query constraint. The system also includes a query constraint resolving module that receives from a user a query to search a federated database using a federated database search engine and determines if the query satisfies at least one query constraints. The system further includes a query suggestion module that determines a query suggestion if the query does not satisfy at least one query constraints.

According to another embodiment, a method for data federation query suggestions includes receiving a query to search a federated database using a federated database search engine. The method also includes determining, using one or more hardware processor of a query constraint system, if the query satisfies at least one query constraints. The method further includes determining a query suggestion if the query does not satisfy at least one query constraints.

According to another embodiment, a non-transitory computer readable medium comprising a plurality of machine-readable instructions which when executed by one or more processors of a server are adapted to cause the server to perform a method including receiving a query to search a federated database using a federated database search engine. The method also includes determining if the query satisfies at least one query constraints, wherein each of the at least one query constraints include a set of column query patterns having a two component tuple, and wherein the query satisfies the at least one query constraints when each of the set of column query patterns in the least one query constraint is satisfied. The method further includes determining a query suggestion if the query does not satisfy each of the set of column query patterns in the least one query constraint, wherein the query suggestion includes a fix to the query corresponding to the at least one query constraints, and wherein the fix includes each of the at least on column query patterns not satisfied by the query.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Figure 1:
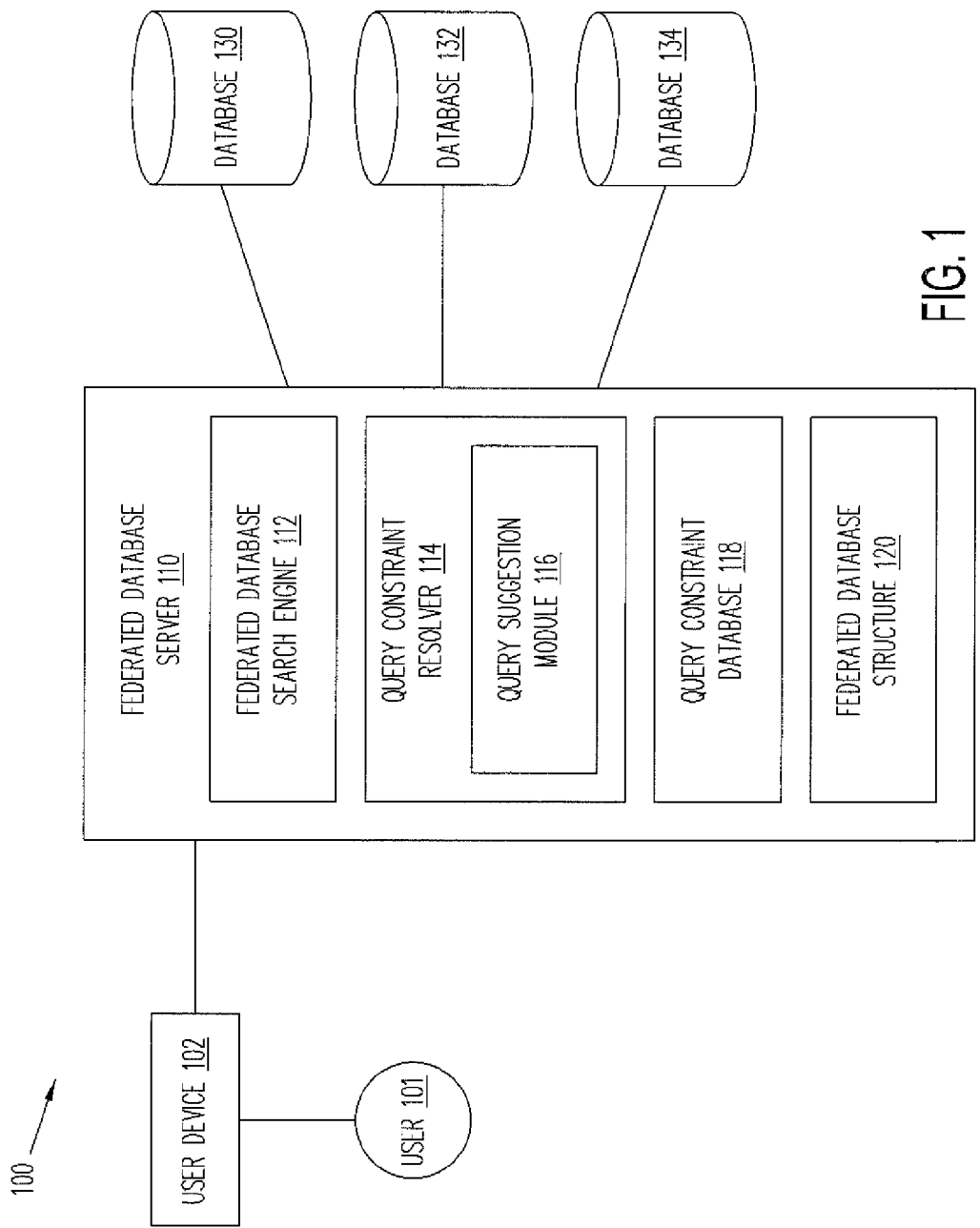
FIG. 1 illustrates an exemplary system for a federated database including query constraints, according to an embodiment.

FIG. 1 illustrates an exemplary system for a federated database including query constraints, according to an embodiment. Terms like "machine," "device," "computer," and "computing system" are used interchangeably and synonymously throughout this document. System 100 may include a server computing system or a client computing system.

In FIG. 1, user 101 may interact with a federated database server 110 through user device 102. For example, user 101 may utilize user device 102 to transmit data queries to a federated database server. User device 102 may be implemented using any appropriate hardware and software configured for wired and/or wireless communication with federated database server 110. For example, in one embodiment, user device 102 may be implemented as a personal computer (PC), a smart phone, personal digital assistant (PDA), laptop computer, tablet computer and/or other types of computing devices capable of transmitting and/or receiving data. Although a user device is shown, the user device may be managed or controlled by any suitable processing device. Although only one user device is shown, a plurality of user devices may be utilized User device 102 may transmit data queries to display search results for a plurality of databases, i.e. databases 130, 132, and 134, corresponding to federated database server 110. Federated database server 110 may include views corresponding to result sets of a stored query. A view may be updated from databases 130, 132, and 132 when the view is invoked, however, views may correspond to large aggregations of data from the data sources. Additionally, databases 130, 132, and 134 may correspond to heterogeneous data sources, each have different data, data structure, and data query language. In various federated database searches, either a view or databases 130, 132, and 134 may be search. However, queries submitted using user device 102 may correspond to generalized and/or broad queries that result in large search result sets. In other embodiments, queries submitted using user device 102 may correspond to queries for sensitive and/or confidential that only specific users may access. Queries may contain one or more words, objects, numbers, symbols, or other input to retrieve same or similar search results. Queries may correspond to a variety of query submission forms, such as natural language queries, or query languages such as SQL, Xpath, OQL, or other query language. Queries may also correspond to particular query submission forms, including the aforementioned query language or query selection through menus and/or forms.

Thus, federated database server 110 includes federated database search engine 112, query constraint resolver 114 having a query suggestion module 116, query constraint database 118, and federated database structure 120. Federated database server 110 may be maintained, for example, by a federated database search provider, including a data federation system utilized by one or more system administrators to connect a plurality of separate and/or heterogeneous databases. Generally, federated database server allows for the connection and searching of constituent databases, where each database is not integrated with each other. In this regard, federated database server 110 may further enable a data architect, such as a system administrator, who establishes the federated database system and sets data query constraints. Thus, based on queries submitted through user device 102, federated database server may limit queries and/or provide query suggestions to fix a query in order to comply with the query constraints. Query constraints, and thus query suggestions, may be determined at the implementation of federated database server 110 by the data architect, or may be re-optimized during and after query submission.

Federated database search engine 112 may correspond to a search engine or other search process usable with queries submitted by user device 102. Federated database search engine 112 may receive the query containing search commands and may execute a search using the query across one or more views and/or databases 130, 132, and 134. For example, a data architect may establish views of data in databases 130, 132, and 134 during the deployment and/or use of federated database server 110. The view may correspond to a result set for a stored query, where the data of the result set may be dynamically updated on initialization and access of the view. A view, however, may correspond to a large result set, especially if federated from several data sources. Thus, federated database search engine 112 may attempt to access large result sets if a query for a view requests too much information.

In various embodiments, federated database search engine 112 may receive the query and may transform it for each respective database 130, 132, and 134 directly according to the query rules of each of database 130, 132, and 134. Federated database search engine 112 may then broadcast the transformed query to each database 130, 132, and 134. Thus, federated database search engine 112 must be able to decompose the query into a subquery that can be handled by each of database 130, 132, and 134. In various embodiments, federated database search engine 112 may receive the query directly from user device 102. However, in other embodiments where query constraints are imposed on the query, federated database search engine may receive the query from query constraint resolver 114 after the query constraints have been imposed on the query.

Federated database search engine 112 may also return search result sets from each of database 130, 132, and 134. Federated database search engine 112 may include a process or processes to display results, including result sets of a search of a view, results of a search of databases 130, 132, and 134, and mapping to each respective database 130, 132, and 134. Federated database search engine 112 may include ranking processes and/or other organizing processes to display the search result sets.

Query constraint resolver 114 may include one or more applications, procedures, and/or processes to receive a query and apply one or more query constraints to the query. Query constraint resolves 115 may check the query against one or more of the query constraints to determine if the query is compliant with the query constraints. If the query is not compliant with at least one of the query constraints, query constraint resolver 114 may not transmit the query to federated database search engine 112 and instead invoke query suggestion module 116. In certain embodiments, the query needs to only satisfy one query constraint. However, in other embodiments, more than one, all, or at least specific query constraints need to be satisfied by the query.

In various embodiments, if the query is not compliant with at least one query constraint, then query suggestion module 116 may generate a query suggestion for transmission to user device 102. The query suggestion may be automatically generated in response to the query being noncompliant with at least one query constraint. The query suggestion may include a warning, suggestion, or other notification to user 101 including a fix to the query. The fix may include information of a revision to the query so that the query is compliant with the query constraint. User 101 may then change the query corresponding to the query suggestion, and resubmit the query to query constraint resolver 114. As previously discussed, in certain embodiments, the query may be required to be compliant with more than one query constraint or even all query constraints. Thus, the query suggestion may include one or more fixes corresponding to one or more of the query constraints.

Query constraint database 118 includes a database of one or more query constraints. Query constraint database 118 may include the one or more query constraints established by a data architect when the data architect creates a federated database and/or the corresponding views of the federated database. However, in other embodiments, a data architect may perform re-optimization of the query constraints based on queries submitted to federated database server 110 and/or other data. Query constraint database 118 may include all query constraints defined by the data architect to be checked against a query by query constraint resolver 114.

Query constraint database 118 may also be utilized by query suggestion module 116 in order to generate a query suggestion for a noncompliant query. For example, a query constraint may require a column query with a like operator to include at least three characters. If the submitted query does not contain a like operator using at least three characters, query suggestion module may utilize the query constraint in query constraint database 118 to generate a query suggestion stating "Please fix the query to include in the first name column a like operator with three characters." This query suggestion may be returned to user device 102 for display to user 101.

Federated database server 1010 includes federated database structure 120. Federated database structure 120 may include all views defined by a data architect and information corresponding to databases 130, 132, and 134. Federated database structure 120 may also include information necessary to transform a query into subqueries directed to each of databases 130, 132, and 134. Thus, where databases 130, 132, and 134 are disparate heterogeneous databases, federated database structure 120 may include information directed to a database management system of each of database 130, 132, and/or 134, database names/domain to access the database, database query language, data in a database for a defined view in the federated database, and/or other necessary information.

Federated database server 110 is also connected to databases 130, 132, and 134. Databases 130, 132, and 134 may correspond to data organized and/or stored in data structures that may be searched by federated database server 110. Each of databases 130, 132, and 134 may include database management systems allowing interaction enabling the location and retrieval of data in the databases. Databases 130, 132, and 134 may include the same or different database management systems. Databases 130, 132, and 134 may be dynamically accessed when a view or a result set of a view is requested. In other embodiments, federated database server 110 may submit subqueries to each of databases 130, 132, and 134 when a query is submitted. It is understood that databases 130, 132, and 134 are exemplary and various embodiments may include a different number of databases connected to federated database server 110 as desired. Thus, federated database server 110 may be connected to one or a plurality of databases.

In various embodiments, user device 102, federated database server 110, and/or databases 130, 132, 134 may be connected directly or through of a network. The network may be implemented as a single network or a combination of multiple networks. For example, in various embodiments, the network may include the Internet or one or more intranets, landline networks, wireless networks, and/or other appropriate types of networks. Thus, the network may correspond to small scale communication networks, such as a private or local area network, or a larger scale network, such as a wide area network or the Internet, accessible by user device 102, federated database server 110, and/or databases 130, 132, and 134.

Figure 2:
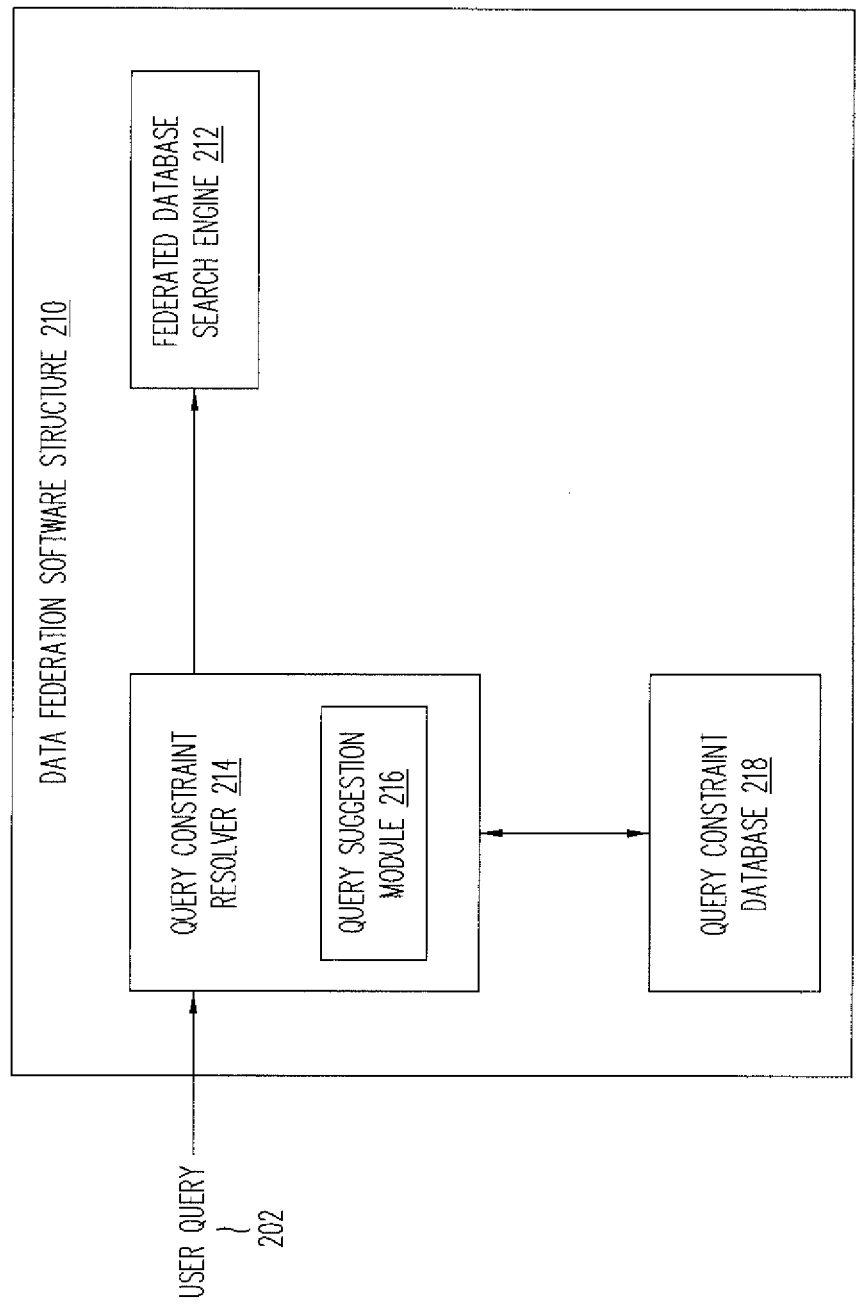
FIG. 2 is a simplified block diagram illustrating a federated database search system utilizing query constraints, according to an embodiment.

FIG. 2 is a simplified block diagram illustrating a federated database search system utilizing query constraints, according to an embodiment. FIG. 2 shows an exemplary interaction between various applications, processes, and/or modules of FIG. 1. Although the components of data federation software structure 210 are shown residing in one structure, it is understood each structure may be implemented and/or executed by a separate computer system or processor.

As shown in FIG. 2, data federation software structure 210 includes query constraint resolver 214 having query suggestion module 216 in communication with query constraint database 218. Additionally, query constraint resolver 214 receives user query 202 and transmits data to federated database search engine 212, which in turn queries stored views. In other embodiments, federated database search engine 212 may transmits subqueries to external federated databases. Federated database search engine 212, query constraint resolver 214, query suggestion module 216, and query constraint database 218 may correspond to federated database search engine 112, query constraint resolver 114, query suggestion module 116, and query constraint database 118 of FIG. 1, respectively.

User query 202 may be submitted to query constraint resolver 214 when received by data federation software structure 210. Query constraint resolver 214 may require the query to be submitted to the federated database in a specific structure and/or query language, for example, an SQL query. In other embodiments, query constraint resolver 214 may include more than one query structure and/or query language for resolution of user query 202.

Query constraint resolver 214 may then check user query 202 against one or more query constraints in query constraint database 218. In various embodiments, each query constraint in query constraint database 218 is associated with a view. When the data architect establishes the federated database system, the data architect may create views that federate several data sources, thus providing a result set for a query across databases 130, 132, and 134. The data architect may also perform re-optimization on views, establishing query constraints at a later time.

Thus, when a data architect defines a view, the data architect may also define query constraints on the view. For example, if the view corresponds to a data set including a first name of a person column, the constraint may include an SQL "like" operator for the first name with at least three characters. Thus, a query having a SQL where clause followed by like and less than 3 characters, the query is not compliant with the query constraint. Query constraints may be designed to limit an amount of returned search results based on a query. Query constraints may also be utilized to limit queries to specific material, thus providing a layer of security based on client identity, query terms, databases, or other desired security feature.

In various embodiments, a query constraint includes a set of Column Query Patterns (CQP). A CQP is a two component tuple, thus has two ordered elements. A query constraint may include one or more CQP that must be satisfied by the query. In various embodiments, each CQP in the query constraint must be satisfied by the query. Thus, a query is said to compile with a query constraint when all of the CQP in the query constraint are satisfied.

A CQP of a query constraint has a syntax of (COLUMN, PATTERN). The pattern may include the limitation on the column. Sample patterns using SQL may appear in the table below.

| | |
|---|---|
| LIKE N+ | clause contains LIKE clause with at least N characters |
| = | clause contains equality on the column |
| != | clause contains a inequality on the column |
| <> | clause contains < or > operator comparison |
| X . . . Y | against constant in the range from X to Y |

-continued

| <> | clause contains < or > operator |
| COLUMN | against some column reference |

Note the above example and list is exemplary and query constraints may include additional and/or different patterns, syntax, and/or tuples.

In other embodiments, a query constraint may impose constraints on a query, where the query is submitted to federated database search engine 212 to be transformed into subqueries submitted to federated data sources. Query constraints may be created without a view and the query constraint may be checked prior to transforming a query into subqueries acceptable by each federated datasource.

Query constraint resolver 214 checks user query 202 in order to assure user query 202 compiles with at least one query constraint. As previously discussed, in various embodiments, user query 202 must compile with at least one, multiple, or all query constraints. If the query constraint compiles with the requisite number of query constraints, query constraint resolver transmits user query 202 to federated database search engine 212.

If query constraint resolver 214 determines user query 202 does not compile with at least one query constraint, then query constraint resolver 214 may invoke query suggestion module 216. Query suggestion module 216 may utilize the query constraint(s) that user query 202 does not comply with to generate a query suggestion. A query suggestion may include a notification to a user including a fix that will allow a user to submit a new query that compiles with at least one query constraint. Thus, in the example previously discussed, the query suggestion may include a fix requiring the user to change user query 202 to include a column "like" operator and at least 3 characters.

Once the query suggestion has been sent to the user, an updated query may be received, where the updated query may be received that is compliant with at least one query constraint. If query constraint resolver 214 compiles the updated query, query constraint resolver 214 may pass the query to federated database search engine 212. Federated database search engine 212 may then utilize views of the federated database system to perform a search and retrieve a result set. In other embodiments, federated database search engine 212 may transform the query into subqueries optimized for each constituent database/database management system. Thus, federated database search engine 212 may then pass subqueries to the databases.

Figure 3:
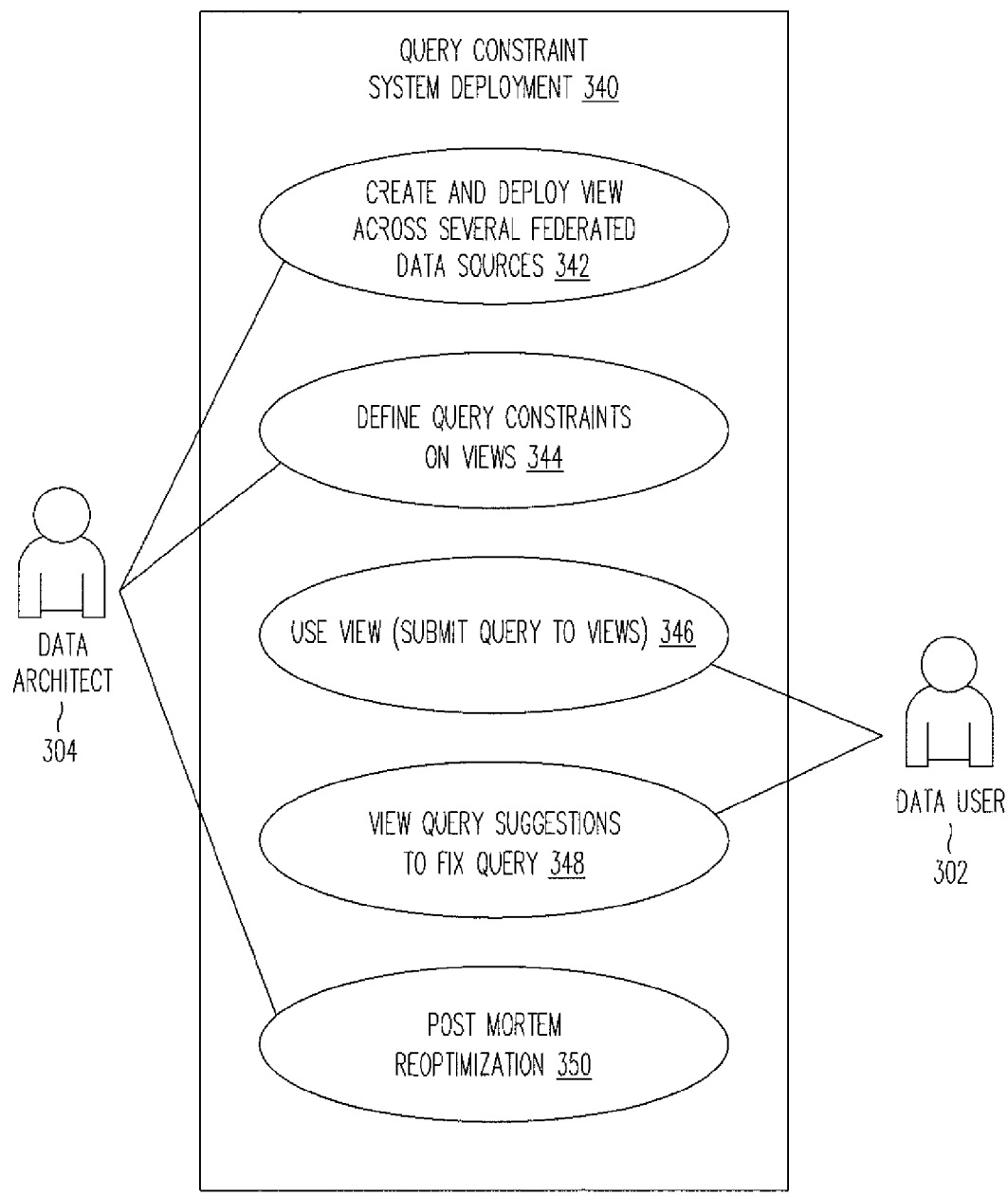
FIG. 3 is a simplified block diagram illustrating an exemplary deployment of a query constraint system on views of a federated database, according to an embodiment.

FIG. 3 is a simplified block diagram illustrating an exemplary deployment of a query constraint system on views of a federated database, according to an embodiment. FIG. 3 shows an exemplary method of a deployment and use by a data architect and a data user using determined views of federated data sources. Thus, both of data user 302 and data architect 304 may utilize respective steps in the deployment of a query constraint system for a federated database.

Query constraint system deployment 340 begins at step 340 where a view is created and deployed across several federated data sources. Data architect 304 establishes the views at 342. Data architect may create and deploy the views on creation of a federated database or during construction and maintenance of the federated database. Additionally, data architect 304 may refine, change, update, or remove a view in the federated database.

As previously discussed, a view is a stored result set for a query across federated data sources. The view may include a stored set of results showing particular data computed and/or collated from the data source(s). Thus, the view may enable data user 302 to view data in disparate databases from one query. A view may include a large amount of data from the various data sources, for example, if a view collects personal information for user names across a plurality of databases. Thus, a query performed on a view may receive excess information if the query is too broad, or may retrieve confidential information.

After data architect 304 has created and deployed a view, data architect 304 may define query constraints on the view at 344. As previously discussed, a view may have one or more query constraints relating to limitations imposed to returning result sets to data user 302. Thus, data architect 304 may define query constraints on views at 344 based on prior experience, desires of data architect or another system administrator, requirements of data user 302, or other needed implementation. For example, data architect 304 may define a query constraint to prevent access to secure and/or confidential data in a federated database. In another example, data architect 304 may define a view based on limiting the scope of a search in order to provide quicker result sets with less performance overhead.

Data user 302 may use a view by submitting a query based on a view at 346. Data user 302 may correspond to a person who needs to visualize, modify, or otherwise utilize data from a view. However, data user 302 may have limited knowledge of a query language, may submit overly broad queries, or may request confidential or otherwise secure data from a view.

Thus, when a query is submitted at 346, the query is checked against query constraints defined for a view. If the query does not compile with at least one query constraint, the query is noncompliant and will not be submitted to a federated database search engine to retrieve the data from a view and/or the disparate databases. However, if the query is compliant, the federated database search engine will execute a search using the view and return a data set to data user 302.

If the query does not satisfy or compile with the query constraint, data user 302 may view query suggestions to fix the query at 348. Query suggestions may include a fix where data user 302 may refine or rewrite the query. Once data user 302 has created an updated query, data user 302 may submit the updated query to the query constraint resolver to compile again.

Data architect 304 may perform post mortem re-optimization on query constraints at 350. Post mortem re-optimization 350 may include refining query constraints based on executed search results. At step 350, data architect 304 may determine if result sets are too large, too small, or include secure data. Data architect 304 may utilize input from data user 302, another network administrator, and/or a data source administrator to determine how to re-optimize query constraints.

Figure 4:
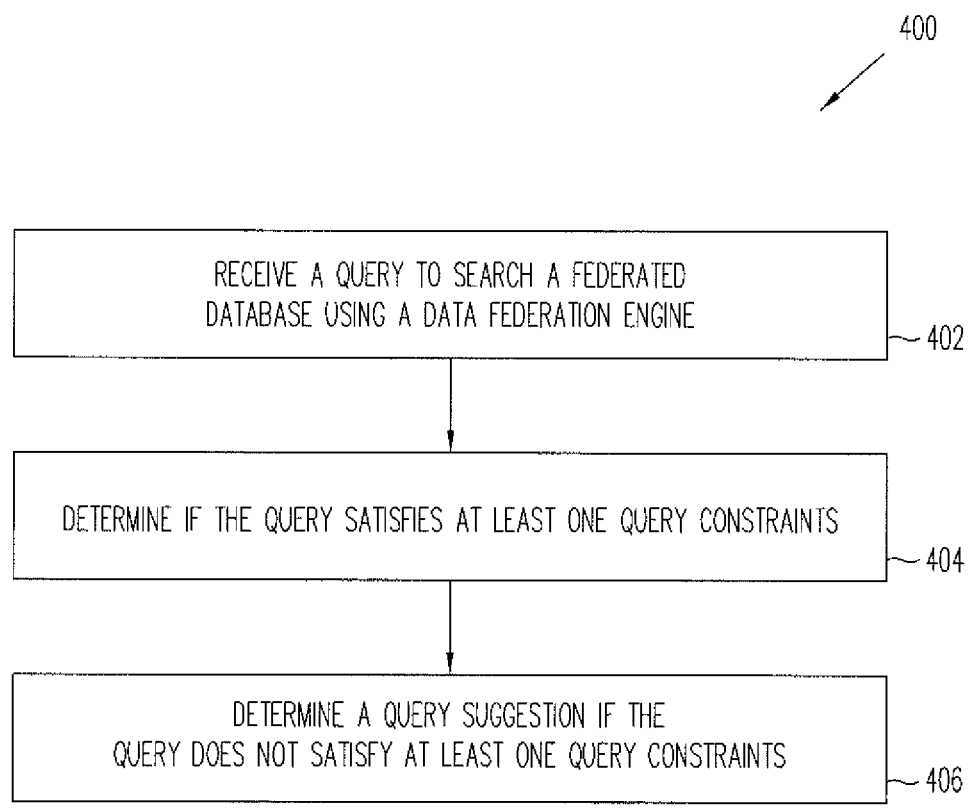
FIG. 4 is a simplified block diagram illustrating an exemplary method of a query suggestion using query constraints, according to an embodiment.

FIG. 4 is a simplified block diagram illustrating an exemplary method of a query suggestion using query constraints, according to an embodiment. Note that one or more steps, processes, and methods described herein may be omitted, performed in a different sequence, or combined as desired or appropriate.

At step 402 a query is received to search a federated database using a federated database search engine. A query constraint resolver may receive the query to search the federated database prior to the federated database search engine. The query constraint resolver may be set by a data architect during creation of the federated database and may be attached to the federated database search engine or may run on separate processors/hardware than the federated database search engine. The query may be in a query language, such as SQL.

The query constraint resolver determines if the query satisfies at least one query constraint, at step 404. A query constraint may include a set of column query patterns (CQP), where each CQP has a two component tuple. Each query constraint may include one or more CQP, where each CQP must be satisfied to satisfy the query constraint. If the CQP are all satisfied, the query compiles with the query constraint.

If the query compiles with the query constraint, the query may be transmitted to the federated database search engine. The federated database search engine may then execute a search to return a result set to a data user based on the query. The search may be executed using defined views by a data architect, so that the result set of a search of a view is not large to burden performance overhead or return secure data.

However, if the query does not compile with the at least one query constraint, a query suggestion module determines a query suggestion to transmit to the data user, where the query suggestion includes a fix to the query, at step 406. The fix may correspond to the query constraint, so the data user knows how to rewrite or change the query to compile with the at least one query constraint. Thus, the data user may transmit an updated query back to the query constraint resolver.

Figure 5:
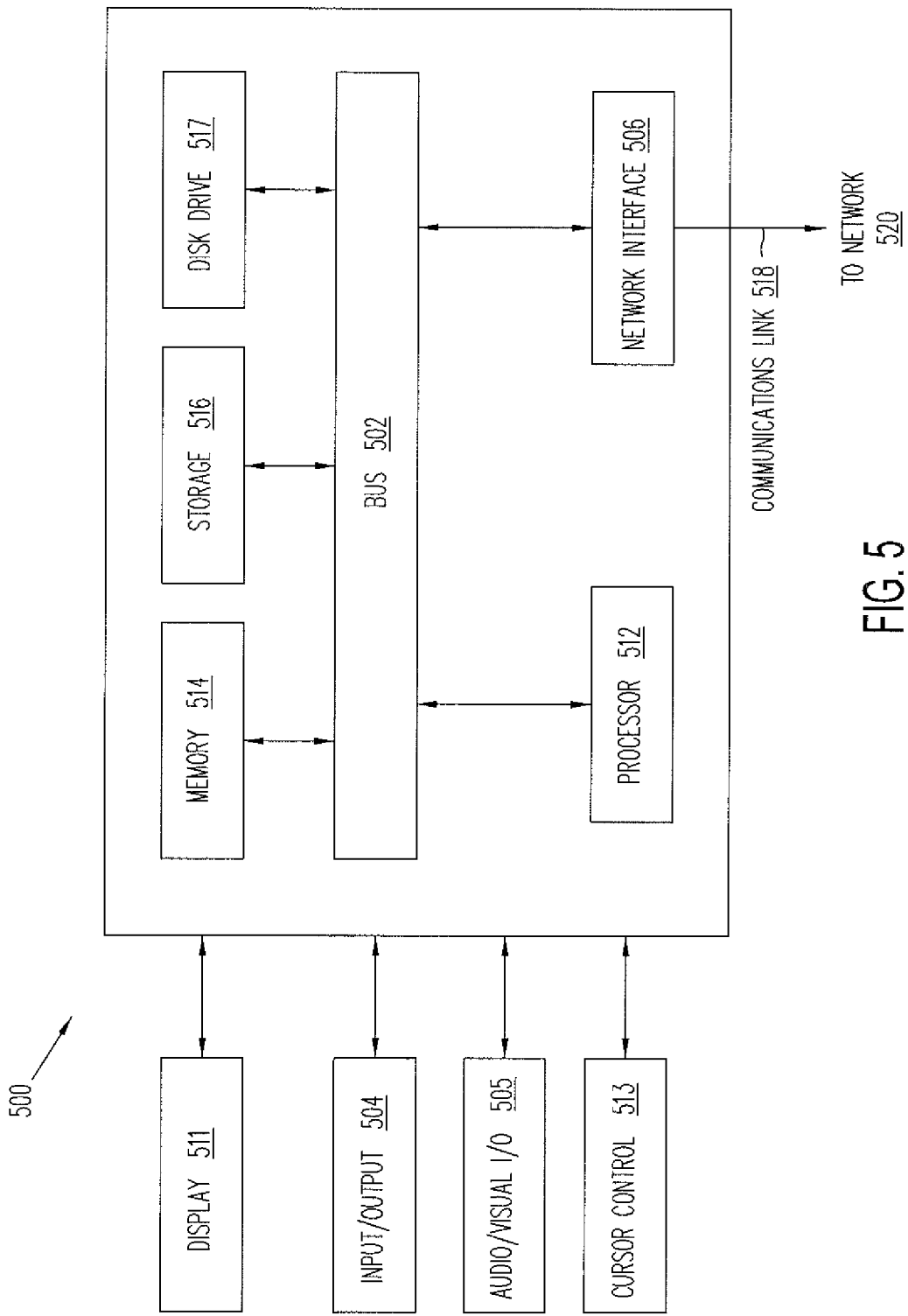
FIG. 5 is a block diagram of a computer system suitable for implementing one or more embodiments of the present disclosure.

FIG. 5 is a block diagram of a computer system 500 suitable for implementing one or more embodiments of the present disclosure. In various embodiments, the endpoint may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another endpoint, a merchant server, or a service provider server via network 520.

Network 520 may be implemented as a single network or a combination of multiple networks. For example, in various embodiments, network 520 may include the Internet or one or more intranets, landline networks, wireless networks, and/or other appropriate types of networks. Thus, network 520 may correspond to small scale communication networks, such as a private or local area network, or a larger scale network, such as a wide area network or the Internet, accessible by computer system 500, for example the various components of system 100 of FIG. 1.

In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for data federation query suggestions, the system comprising:
    a non-transitory memory storing a query constraint database including at least one query constraints; and
    at least one hardware processor in communication with the non-transitory memory and configured to execute:
        a query constraint resolver that receives from a user a query to search a federated database comprising a plurality of non-integrated databases using a federated database search engine with a client identity of the user submitting the query and determines if the query satisfies the at least one query constraints for querying the plurality of non-integrated databases without submission of the query to each of the plurality of non-integrated databases, wherein the plurality of non-integrated databases are selected by a data architect for search using the query and stored to disparate memory storages connected over a network, wherein the data architect sets the at least one query constraint on views of result sets from the query of the plurality of non-integrated databases with query suggestions for non-compliant queries based on the client identity, wherein the each of the plurality of non-integrated databases comprise a separate query rule list, and wherein the federated database search engine transforms the query for the each of the plurality of non-integrated databases using the separate query rule list for the each of the plurality of non-integrated databases on receipt of the query; and
        a query suggestion module that determines a query suggestion if the query does not satisfy at least one query constraints,
        wherein the query constraint resolver further communicates, to the data architect, search results comprising at least one view for the query from the each of the plurality of non-integrated databases, wherein the at least one view comprises secure data, receives an update for re-optimization of the at least on query constraints from the data architect, wherein the update limits access to the secure data based on the client identity, and updates the at least one query constraints in the query constraint database based on the update for re-optimization received from the data architect.

2. The system of claim 1, wherein each of the at least one query constraints include a set of column query patterns having a two component tuple.

3. The system of claim 2, wherein the query satisfies the at least one query constraints when each of the set of column query patterns in the least one query constraint is satisfied.

4. The system of claim 2, wherein the query suggestion includes a fix to the query corresponding to the at least one query constraints.

5. The system of claim 4, wherein the fix includes each of the at least one column query patterns not satisfied by the query.

6. The system of claim 1 wherein the query constraint resolver transmits the query to the federated database search engine if the query is compliant with the at least one query constraints.

7. The system of claim 1, wherein query constraint resolver receives an updated query to search the federated database using the federated database search engine, wherein the updated query is compliant with the at least one query constraints.

8. The system of claim 1, wherein the query is a structured query language (SQL) query.

9. A method for data federation query suggestions, the method comprising:
    receiving a query to search a federated database comprising a plurality of non-integrated databases using a federated database search engine with a client identity of the user submitting the query, wherein the lurality of non-integrated databases are selected by a data architect for search using the query and stored to disparate memory storages connected over a network, wherein the data architect sets the at least one query constraint on views of result sets from the query of the plurality of non-integrated databases with query suggestions for non-compliant queries based on the client identity, wherein each of the plurality of non-integrated databases comprise a separate query rule list, and wherein the federated database search engine transforms the query for the each of the plurality of non-integrated databases using the separate query rule list for the each of the plurality of non-integrated databases on receipt of the query;
    determining, using one or more hardware processor of a query constraint system, if the query satisfies at least one query constraints for querying the plurality of non-integrated databases without submission of the query to the each of the plurality of non-integrated databases;
    determining a query suggestion if the query does not satisfy at least one query constraints;
    communicating, to the data architect, search results comprising at least one view for the query from the each of the plurality of non-integrated databases, wherein the at least one view comprises secure data;
    receiving an update for re-optimization of the at least on query constraints from the data architect, wherein the update limits access to the secure data based on the client identity; and
    updating the at least one query constraints in the query constraint database based on the update for re-optimization received from the data architect.

10. The method of claim 9, wherein each of the at least one query constraints include a set of column query patterns having a two component tuple.

11. The method of claim 10, wherein the query satisfies the at least one query constraints when each of the set of column query patterns in the least one query constraint is satisfied.

12. The method of claim 10, wherein the query suggestion includes a fix to the query corresponding to the at least one query constraints.

13. The method of claim 12, wherein the fix includes each of the at least one column query patterns not satisfied by the query.

14. The method of claim 9 further comprising:
transmitting the query to the federated database search engine if the query is compliant with the at least one query constraints.

15. The method of claim 9 further comprising:
receiving an updated query to search the federated database using the federated database search engine, wherein the updated query is compliant with the at least one query constraints.

16. The method of claim 9, wherein the query is a structured query language (SQL) query.

17. A non-transitory computer readable medium comprising a plurality of machine-readable instructions which when executed by one or more processors of a server are adapted to cause the server to perform a method comprising:
receiving a query to search a federated database comprising a plurality of non-integrated databases using a federated database search engine with a client identity of the user submitting the query, wherein the plurality of non-integrated databases are selected by a data architect for search using the query and stored to disparate memory storages connected over a network, wherein the data architect sets the at least one query constraint on views of result sets from the query of the plurality of non-integrated databases with query suggestions for non-compliant queries based on the client identity, wherein each of the plurality of non-integrated databases comprise a separate query rule list, and wherein the federated database search engine transforms the query for the each of the plurality of non-integrated databases using the separate query rule list for the each of the plurality of non-integrated databases on receipt of the query;

determining if the query satisfies at least one query constraints for querying the plurality of non-integrated databases without submission of the query to the each of the plurality of non-integrated databases, wherein each of the at least one query constraints include a set of column query patterns having a two component tuple, and wherein the query satisfies the at least one query constraints when each of the set of column query patterns in the least one query constraint is satisfied;

determining a query suggestion if the query does not satisfy each of the set of column query patterns in the least one query constraint, wherein the query suggestion includes a fix to the query corresponding to the at least one query constraints, and wherein the fix includes each of the at least on column query patterns not satisfied by the query;

communicating, to the data architect, search results comprising at least one view for the query from the each of the plurality of non-integrated databases, wherein the at least one view comprises secure data;

receiving an update for re-optimization of the at least on query constraints from the data architect, wherein the update limits access to the secure data based on the client identity; and updating the at least one query constraints in the query constraint database based on the update for re-optimization received from the data architect.

* * * * *